United States Patent
Hedman

(10) Patent No.: US 6,655,327 B1
(45) Date of Patent: Dec. 2, 2003

(54) COMBUSTION METHOD FOR AN INTERNAL COMBUSTION ENGINE

(75) Inventor: Mats Hedman, Sparreholm (SE)

(73) Assignee: CARGINE Engineering AB, Helsinborg (SE)

( * ) Notice: Subject to any disclaimer, the term of this patent is extended or adjusted under 35 U.S.C. 154(b) by 0 days.

(21) Appl. No.: 09/958,315

(22) PCT Filed: Apr. 5, 2000

(86) PCT No.: PCT/SE00/00650
§ 371 (c)(1),
(2), (4) Date: Jan. 4, 2002

(87) PCT Pub. No.: WO00/61929
PCT Pub. Date: Oct. 19, 2000

(30) Foreign Application Priority Data

Apr. 8, 1999 (SE) .............................................. 9901241

(51) Int. Cl.$^7$ ................................................ F02B 33/00
(52) U.S. Cl. ........................................... 123/68; 60/598
(58) Field of Search .............................. 123/68; 60/598, 60/599

(56) References Cited

U.S. PATENT DOCUMENTS

| 729,984 | A | * | 6/1903 | Wallmann | 123/68 |
|---|---|---|---|---|---|
| 1,296,686 | A | * | 3/1919 | Neff | 123/68 |
| 1,825,525 | A | * | 9/1931 | Johansson | 123/68 |
| 3,267,661 | A | | 8/1966 | Petrie | 60/598 |
| 4,211,082 | A | * | 7/1980 | Bristol | 123/68 |
| 4,215,659 | A | * | 8/1980 | Lowther | 123/68 |
| 4,783,966 | A | * | 11/1988 | Aldrich | 60/599 |
| 5,103,645 | A | * | 4/1992 | Haring | 123/68 |
| 5,638,681 | A | * | 6/1997 | Rapp | 123/68 |

FOREIGN PATENT DOCUMENTS

| DE | 2402682 | 7/1974 | |
|---|---|---|---|
| DE | 3418361 | 10/1984 | |
| DE | 19847851 | 4/1999 | |
| EP | 0463818 | 1/1992 | 123/68 |

* cited by examiner

Primary Examiner—Thomas Denion
Assistant Examiner—Thai-Ba Trieu
(74) Attorney, Agent, or Firm—Oblon, Spivak, McClelland, Maier & Neustadt, P.C.

(57) ABSTRACT

A combustion method at a piston combustion engine showing a combustion chamber, in which a piston repeatedly moves in a work producing power stroke followed by an exhaust stroke with intermediate upper respective lower dead centers, in which dead centers the piston motion direction is changed. Air, which will be brought into the engine combustion chamber, is compressed to a certain pressure, whereupon it is brought into the combustion chamber with or without fuel during at least a part of the power stroke. The compressed air with or without fuel is brought into the combustion chamber during such a part of the power stroke determined by a required torque at different engine speeds, from that the piston is situated right before, at or right after the top dead center, and that fuel is combusted with the supplied air during the power stroke.

8 Claims, 1 Drawing Sheet

COMBUSTION METHOD FOR AN INTERNAL COMBUSTION ENGINE

FIELD OF THE INVENTION

Present invention refer to a combustion method for a piston combustion engine showing a combustion chamber, in which a piston repeatedly moves in a work producing power stroke followed by an exhaust stroke with intermediate upper and lower dead centre, in which dead centres the motion direction of the piston is changed. Compressed air with or without fuel is brought into the combustion chamber in a way that improves the properties of the engine in relation to known engines.

BACKGROUND OF THE INVENTION

Internal combustion engines pollute the environment through exhaust emissions. Improved combustion techniques and efficiency combined with introduction of catalytic converters have reduced these emissions, but the increase in the use of internal combustion engines entails that these improvements are not sufficient. There is currently an accelerating environmental lack of balance, which is desirable to counteract.

Forming of nitrogen oxides, NOx, are caused by the high temperatures prevailing during combustion in the conventional engines. Reduction of NOx is done by the use of catalytic converters for after treatment of exhausts which have good effect in gasoline engines but not in diesel oil engines which however have better efficiency and therefore produce less carbon dioxide. It is known that cooling the air, used by engines during the combustion process, reduce the amount of formed NOx because the combustion temperature is lowered. For that reason as cool air as possible, considering the combustion process, is introduced in diesel oil engines.

An attempt to improve the properties of an engine to, among other things, solve these problems, is described in the European publication EP 0 463 818. The publication describes a combustion method in an piston engine, which takes place at a substantially constant pressure, which solve some of thee above mentioned problems, but differentiate in a determining way from the combustion method according to the, present invention.

DESCRIPTION OF THE INVENTION

The object of present invention is to solve the above mentioned problems and to bring about a combustion method for an engine with moreover improved properties particularly with reference to its torque and efficiency. The object has been reached with a combustion method in a piston combustion engine showing a combustion chamber, in which a piston repeatedly moves in a work producing power stroke followed by an exhaust stroke with intermediate upper and lower dead centres, in which dead centres the piston motion direction is changed. Air, which will be brought into the combustion chamber of the engine, is compressed to a certain pressure and is brought into the combustion chamber at a substantially constant pressure with or without fuel during a substantial part of the power stroke from that the piston is just before, at or just after the upper dead centre. Fuel is combusted together with the fed in air during the power stroke.

Preferably the compressed air is stored in an accumulator tank before it is brought into the combustion chamber. This tank can be related to the engine as a separate container or be included in it. It is within the scope of the invention to use one or more accumulator tanks for that purpose.

Preferably the compressed air with or without fuel is brought into the combustion chamber during such a part of the power stroke which is determined by the required torque at different engine speeds. This means that the compressed air can be brought into the combustion chamber during the entire power stroke. In practical design however, the compressed air will be supplied during up to 25% of the linear motion from the upper dead centre, to obtain optimal engine torque.

It should be noted that this engine device, which makes it possible to realise the process according to the invention, also could be used as a genuine compressed air engine. The compressed air, which preferably is stored in the present accumulator, can be used to operate an internal combustion engine without fuel supply. A vehicle equipped with such an engine can accordingly be moved entirely with compressed air as energy source at least for a shorter distance.

The combustion chamber volume can be varied and adjusted during the power stroke into a size, which is determined by a required torque at different engine speeds. Likewise the air which will brought into the engine can be compressed during simultaneous cooling by for example water injection. This water can also be mixed with an alcohol, for example ethyl alcohol, preventing the water from freezing and to lower the surface tension. Likewise other elements lowering the surface tension, for example tensides, can be added. The amount of injected water is determined based on what kind of fuel currently being used for the combustion in the engine. In one application of the invention the air which will be brought into the engine at least partly can be compressed by engine braking in general sense.

Additional details and characteristics are presented in the following description and in the claims.

According to the invention the combustion method differs from what is used in common engines by the way of that the air, which in conventional engines is compressed and immediately used in the combustion process, instead passes and/or is stored in an accumulator at high pressure. In this accumulator air compressed by engine braking, e.g. to reduce speed for a vehicle, also can be stored. This air can be cooled, depending on the current fuel, either during the compression, or in the accumulator tank, or in the way to or from the tank. The air used by the engine is taken from the accumulator. It can be brought into the combustion chamber starting in or near the piston top dead centre. Fuel can be present in the supplied air and/or be injected directly into the cylinder. The temperature of the supplied air is substantial lower than it otherwise would be after the compression stroke and its density is correspondingly higher. This results, among other things, in elimination of knocking combustion problems, which does exist in conventional engines.

In engines with fixed compression ratio the supplied amount of air or the mix of fuel air is adjusted to currently desired torque by keeping the air inlet valve open for a longer or shorter period of time. In engines with variable compression ratio the compression volume is adjusted for optimal efficiency at consideration of knocking combustion and exhaust emissions. This technology can also be used in combination with the combustion method according to the invention. It is consequently possible to determine the size of the volume of the combustion chamber depending on the currently desired torque and then, or at the same time, feed the needed mix of fuel and air.

The method according to the invention is particularly beneficial if the piston in the exhaust stroke is allowed to turn as near the cylinder head as possible. This results in good expansion ratio and good possibility to evacuate exhausts. Further, starting right before, in or just after the top dead centre, air or a mix of fuel and air could be brought into the combustion chamber at the same time as the piston moves down until exactly the right amount of air or mix of fuel and air as for the currently desired torque is supplied, whereupon the supply stops. The method is more beneficial if the supply of the mix of fuel and air or air can occur through one or more valves which are capable of opening and closing rapidly depending on the currently optimised parameters. The method according to the invention involves, among other things, that the current torque is determined by the amount of supplied mix of fuel and air or air. At lower load the ignition may occur before the valve for supply of the mix fuel and air or air closes, which may occur before the upper dead centre.

The torque of the engine can increase considerable through extending the time of supplying the combustion chamber with the mix of fuel and air or air, and delaying the combustion. The size of an engine may consequently be reduced to reduce the fuel consumption still having a torque corresponding to a big engine. Delayed combustion involves loss of efficiency, which however may be compensated by using an exhaust turbo in a traditional way. Further may, especially at such occasions, surplus of water continuously condensed in the compressed air accumulator, be added to the combustion in order to improve the efficiency by internal cooling.

Air or fuel air mix is brought into the combustion chamber at large velocity during a short period of time. Fuel can accordingly accompany the supplied air or be injected directly into the cylinder. The air stream may be directed to get turbulence and/or vortex for favourable combustion. Due to high pressure and low temperature, channels and valves for air supply can be made small, improving the possibilities to control rapid processes. An engine may be stopped and then started using compressed air which is beneficial in, for example, city driving. One large problem with conventional engines is that valves, exhaust port, exhaust turbo and catalytic converter may get damaged by the high exhaust temperatures which appears at high load. This problem is avoided in the present invention by the relatively low exhaust temperatures. It is advantageous to the invention to compress the air for the engine, outside of the expansion space of the cylinder, during simultaneous cooling to decrease necessary technical compression work. Condensation water from the compressed air accumulator may be used for internal cooling by water injection during compression. Compression may be done at the lower side of the piston at the same time as expansion occurs at the upper side of the piston, or in a compressor operated by the engine. In, for example, a six cylinder engine three cylinders can be used as compressors.

In internal combustion engine, driven vehicles the speed to a large extent will be reduced by engine braking, compressing air into the accumulator tank. This means that stored energy can be used at acceleration by expansion of compressed air, by charging the engine at higher pressure or by charging the engine with a larger volume of compressed air. The accumulator tank contains the largest air mass at maximal cooling of the compressed air. The size of the accumulator should be adjusted to the current engines field of application. The accumulator of compressed air for an engine to a portable machine, for example a power saw, should have at least as big volume as the combustion chamber. In vehicles it will be possible to dimension the equipment to maximise the air-cooling.

Cooling after the compression stroke will give energy losses but this will be compensated by the possibility of greater expansion ratio and by lower combustion temperature reducing heat transfer to the surrounding walls, and by greater Cp/Cv ratio. Removing heat during the compression stroke improves the efficiency by reducing technical compression work.

DESCRIPTION TO DRAWINGS

The invention is below described by a design example in referring to enclosed drawings.

Figure 1:
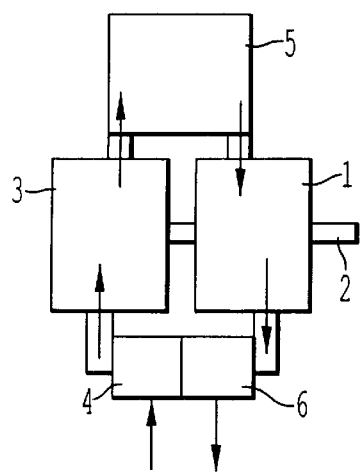
FIG. 1 shows, schematically from above, a two-stroke piston engine including a work cylinder and a compressor cylinder for fuel air mix.

The schematically showed engine according to FIG. 1 includes a work cylinder 1 with a piston 1.1 connected to a piston in a compressor cylinder 3 by an engine shaft 2. Fuel air mix is sucked and fed into the compressor cylinder 3 by a rotary compressor 4 for low pressure. The fuel air mix is compressed to higher pressure in the compressor cylinder 3, possibly during simultaneous cooling by, for example, injection of water into this cylinder, and from there fed into an accumulator tank 5, where the mix may be cooled further and kept at desired pressure and temperature. From the accumulator 5, the cooled fuel air mix is fed into the work cylinder 1 where it is ignited and combusted, and then exhausted through an exhaust turbine 6 driving the low pressure compressor 4. The arrows in FIG. 1 indicate the passage of the fuel air mix and the exhaust gases through the engine.

Figures 2, 3:
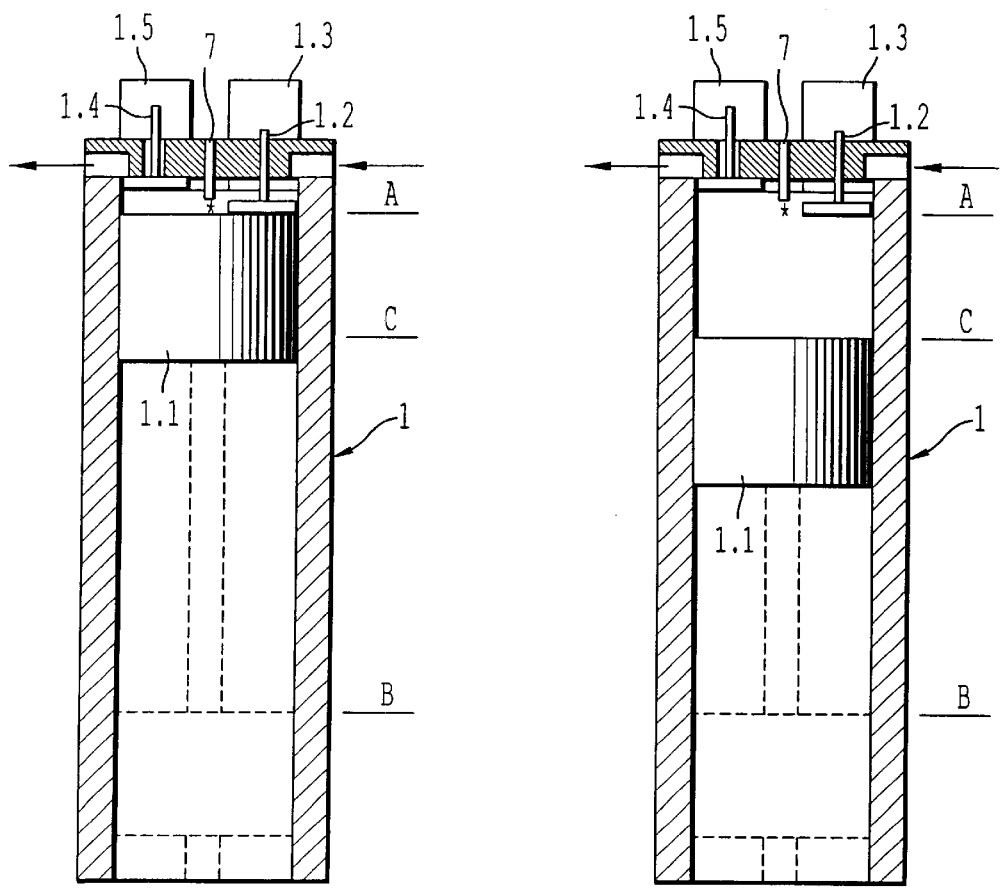
FIG. 2 shows a part of the work cylinder according to FIG. 1 in a length section with the piston situated at the top dead centre.
FIG. 3 shows the work cylinder according to FIG. 2 with the piston during motion situated apart from the top dead centre.

FIG. 2 shows a part of the work cylinder 1 in a length section with the piston 1.1 which is movable between the top dead centre A and the bottom dead centre B. The work cylinder 1 further includes an inlet valve 1.2 with corresponding actuator 1.3 for opening and closing and an outlet valve 1.4 with corresponding actuator 1.5. The actuators 1.3 and 1.5 may be represented by pneumatic, hydraulic or electromagnetic devices with the effect of opening and closing valve 1.2, 1.4. The actuators 1.3 and 1.5 receive then control signals from a control computer, not included in the figures. A spark plug 7 is positioned at the top of the work cylinder 1 to ignite the fuel air mix. In the position showed in FIG. 2 the piston 1.1 is situated at the top dead centre A after the exhaust. In that position the outlet valve 1.4 is closed and the inlet valve 1.2 opened, connecting the accumulator 5 to the work cylinder 1.

FIG. 3 shows the pistons 1.1 position C in the work cylinder 1 when it during intake of fuel air mix has moved 25% of the distance between the top dead centre A and the bottom dead centre B. The outlet valve 1.4 is closed while the inlet valve 1.2 still is open and the fuel air mix flows into the work cylinder. The supply of fuel air mix is stopped when the currently desired torque is calculated to be reached. This is made by a sensor for desired torque sending a signal to a control computer, in which the necessary amount of fuel air mix is calculated. This activates the actuator 1.3 for the inlet valve 1.2 to close it at the same moment as the desired amount is brought into the work cylinder 1, exemplified by the pistons 1.1 position at the point C. The sparking plug 7 is activated just before or in connection to the closing of the inlet valve 1.2, starting the combustion of the fuel air mix and the power stroke of the piston continuing to the bottom dead centre. The closing of the inlet valve 1.2 and ignition may occur within a range of the piston motion from just before the upper dead centre A to about 50%, and especially before 25%, of the linear distance between the dead centres A and B.

In an alternative design of the engine the fuel air mix may be replaced by air and fuel may be supplied by injection right before or directly into the work cylinder. In another alternative design the sparking plug may be eliminated and work with ignition of the fuel air mix by compression heat.

In yet another alternative design of the combustion method, according to the invention, combustion may occur at the same time, and as long as fuel air mix or air and fuel is brought into the work cylinder 1 through the inlet valve 1.2. The ignition of the fuel air mix may in this alternative occur at any time during the piston power stroke from opening of the inlet valve 1.2.

What is claimed is:

1. A combustion method in a piston combustion engine having a combustion chamber, comprising the steps of:

moving a piston repeatedly in a work producing power stroke followed by an exhaust stroke with intermediate upper and lower dead centres, at which dead centres the piston motion direction is changed, inputting a gas compressed to a certain pressure into the combustion chamber during at least a part of the power stroke, controlling the part of the power stroke in which the gas is inputted into the combustion chamber based on a determination of a required engine torque at different engine speeds, and combusting a fuel with the supplied gas during the power stroke.

2. The method according to claim 1, including a step of storing the compressed gas in an accumulator tank before inputting the gas into the combustion chamber.

3. The method according to claim 1, wherein the combustion chamber volume is varied and adjusted during the power stroke into a size which is determined by the required torque at different engine speeds.

4. The method according to claim 1, further comprising cooling the input gas.

5. The method according to claim 4, wherein water is used for cooling.

6. The method according to claim 5, wherein the amount of water being used is determined based on what kind of fuels are currently being used for combustion in the engine.

7. The method according to claim 1 wherein the input gas is at least partly compressed by engine braking.

8. The method according to claim 1, wherein the fuel is included in the input gas.

* * * * *